May 20, 1930.   L. E. IKE ET AL   1,759,311
WINDSHIELD SCREEN
Filed May 18, 1928   3 Sheets-Sheet 3
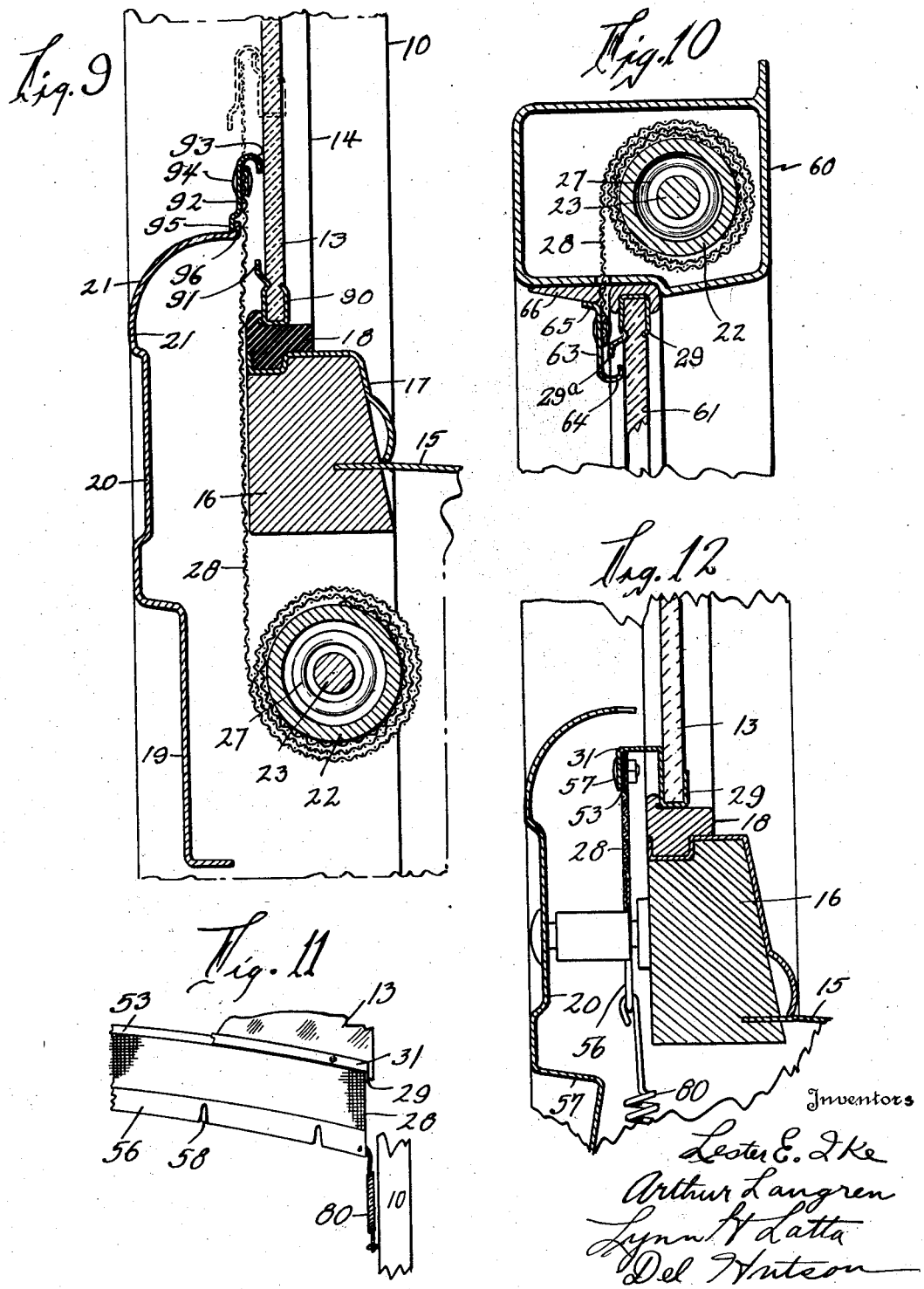

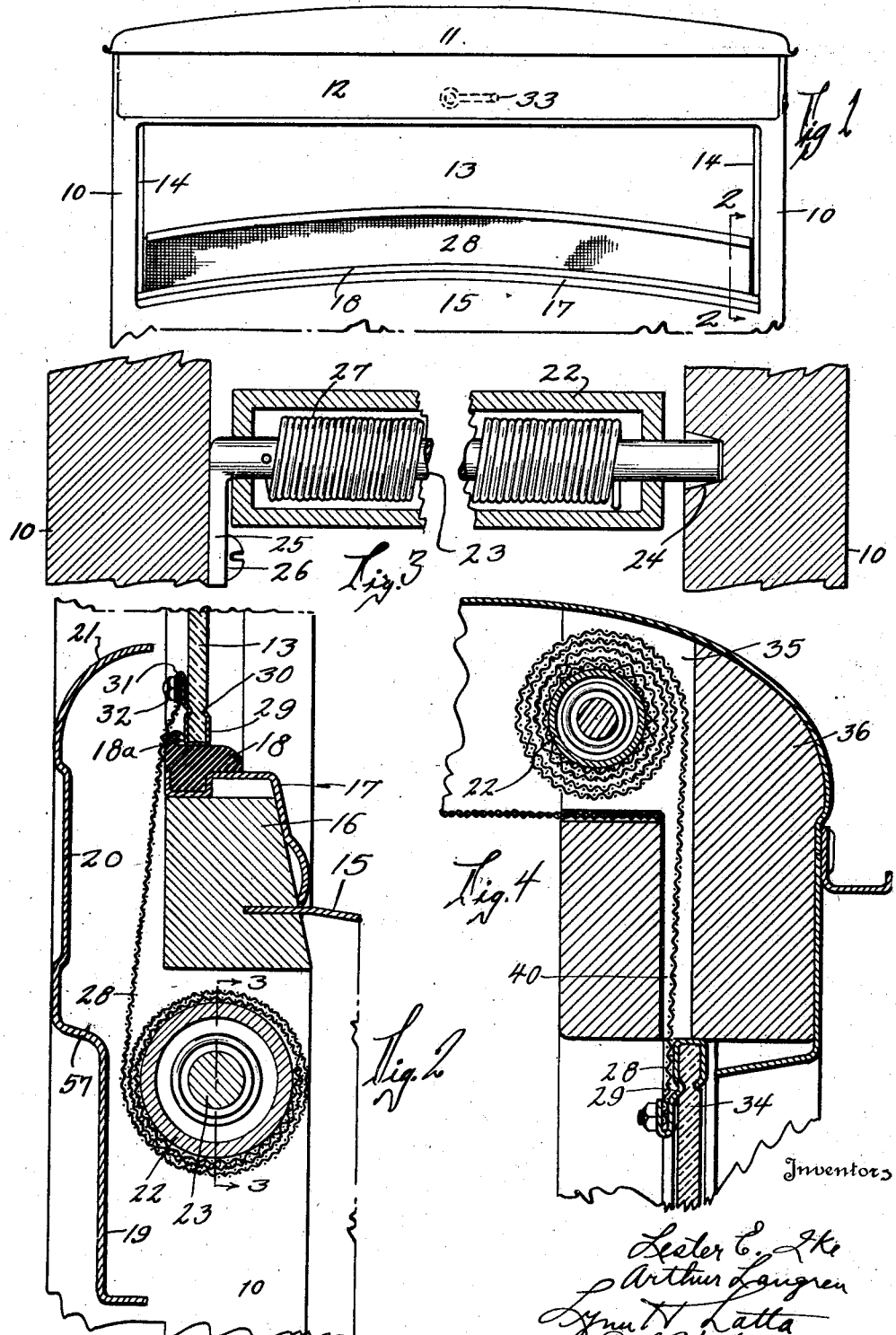

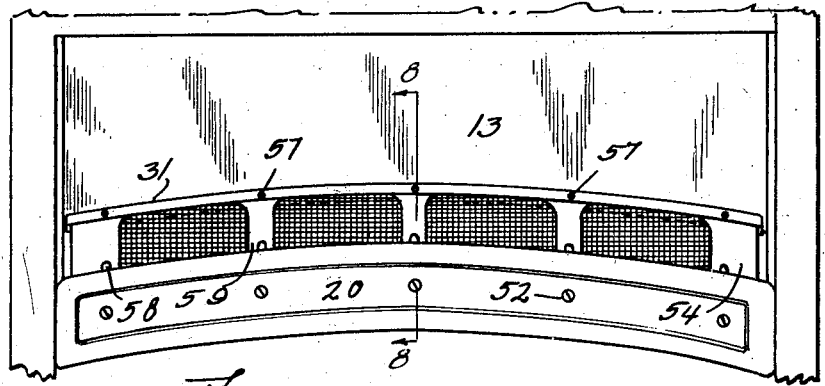
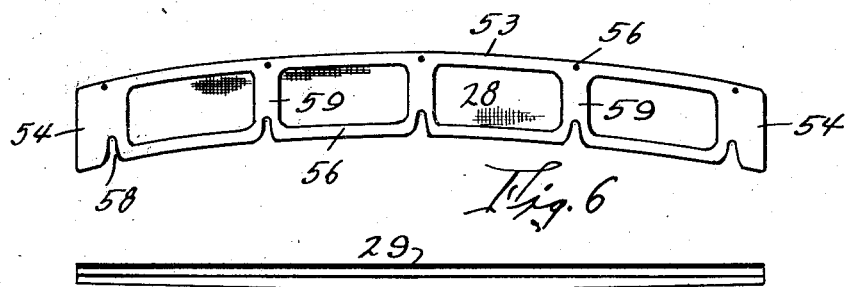
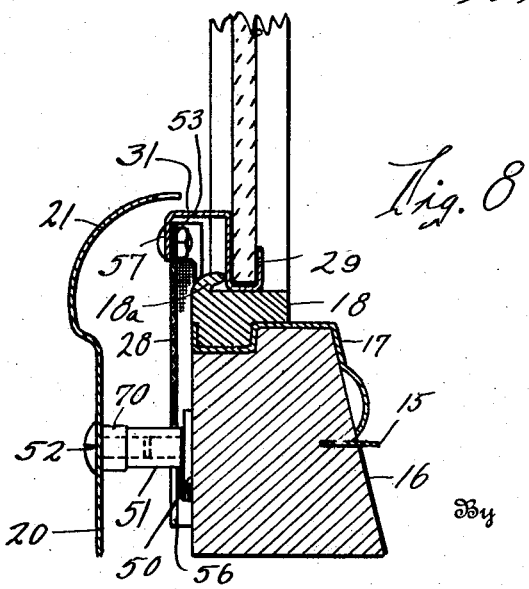

Patented May 20, 1930

1,759,311

UNITED STATES PATENT OFFICE

LESTER E. IKE, OF PLAINVIEW, NEBRASKA, ARTHUR LANGREN AND DEL HUTSON, OF LE MARS, IOWA, AND LYNN H. LATTA, OF SIOUX CITY, IOWA

WINDSHIELD SCREEN

Application filed May 18, 1928. Serial No. 278,898.

Our invention relates to windshield screens for vehicles of the type employing what is commonly known as the Fisher V—V type windshield.

More particularly, it is our object to provide a screen adaptable to a windshield of the type wherein the instrument board panel is separated by a ventilating air space from the cowl frame member, against which the glass of the windshield rests when closed and in which said windshield glass slides vertically in its own plane.

More particularly, it is our object to provide a screen for a windshield of this type which is adapted to be attached to the windshield glass and associated relative to the vehicle in such a manner that the screen will be positioned at all times below the lower extremity of the glass, moving with the glass to cover the opening between the lower edge of the glass and the cowl frame.

A primary object of our invention is to provide a screen arrangement which may be installed readily in a vehicle of the type under discussion without necessitating any alteration in the vehicle and yet possessing the quality of moving with the glass of the windshield and disappearing from view when the glass is in closed position.

Another object is to provide an arrangement in which the screen will cover not only the opening between the glass and the upper edge of the instrument board panel, but also the opening between the glass and the cowl frame leading to the indirect ventilation space between the cowl frame and the panel.

Another object is to provide a screen which is very simple, durable and inexpensive in construction.

Another object is to provide a screen which is very easy to install.

A further object is to provide an arrangement for mounting the screen relative to the glass so that it may move with the glass without interference from the cowl frame member or the instrument board panel.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Fig. 1 is a front view of a portion of a vehicle illustrating one form of our invention attached thereto.

Fig. 2 is a vertical, sectional view taken on the line 2—2 of Fig. 1.

Fig. 3 is a sectional view taken transversely through the vehicle illustrating the spring roller used with the form of our invention shown in Fig. 1.

Fig. 4 is a sectional view showing how a screen operating on the same principle as the screen of Fig. 1 may be attached to a side window of the vehicle.

Fig. 5 is a view of the windshield of a vehicle from the inside, the preferred form of our invention being attached thereto.

Fig. 6 is a view of the screen detached from the vehicle.

Fig. 7 is a plan view of the device for attaching the screen to the glass.

Fig. 8 is a sectional view taken on the line 8—8 of Fig. 5.

Fig. 9 shows a further modification of our invention embodying a detachable feature.

Fig. 10 shows the same modified form applied to the door or side window of a vehicle.

Fig. 11 is a fragmentary view of a further modified form of the invention, and

Fig. 12 is a sectional view of the same.

The problem of protecting the ventilating opening of a windshield of an automotive vehicle against the ingress of bugs, cinders and the like has become quite an important problem in view of the increasing number of accidents caused by insects coming in through the windshild, causing the driver to lose control of the car, or caused by cinders striking the eyes of the driver with a similar result.

With the advent of automobile beds by means of which vehicles may be used for sleeping quarters, the problem of screening the vehicle also becomes more important.

Screens have already been devised for all types of vehicles including the type having the V—V windshield. Most of these screens involve a fixed frame, secured permanently to the body of the vehicle in such a way as to remain always in view. With a vehicle in which the windshield swings, this type of screen is probably the only practical one. However, there are many advantages in a screen which will disappear when the windshield is closed, chief among them being that the screen will be thus protected from the elements from collecting dust and débris and from the force of the wind. Another advantage in a disappearing screen resides in the enhanced appearance.

The vehicle to which our invention is attached particularly comprises the side posts 10, the roof 11, the visor 12, the windshield glass 13, slidable vertically in rubber guides 14, the cowl 15, the rear transverse cowl frame member 16, the metal seat 17, and the rubber cushion 18, against which the glass 13 rests when in closed position.

The instrument board 19 is formed integrally with a pressed sheet metal panel 20, which is spaced from the cowl member 16 as shown in Fig. 2, to form a ventilating space, into which the air is directed by the hood 21, formed at the upper extremity of the panel 20.

Several features of this construction, which is common in a large number of present day vehicles, may be noted, since these features have raised problems in connection with the providing of a suitable screen for this type of vehicle. In the first place, the instruments which are mounted upon the instrument board 19, although not shown in the drawings, occupy a considerable amount of space below the frame member 16 and there are wires and tubes extending from the panel 19 forwardly to the dash of the vehicle.

In the second place, the rubber cushion 18 extends on either side of the glass 13 in order to securely seal the vehicle against the entrance of moisture when the windshield is closed and the frame member 16 also projects inwardly beyond the plane of the glass 13.

In the third place, the hood 21 is spaced very closely to the glass 13 and in most models is curved from end to end so as to be closer to the glass at its ends than at the center.

In the fourth place, in a majority of the windshields of this type, the panel 20 is secured to the frame member 16 by means of a threaded stud 50, secured to the member 16, a spacing sleeve 51, threaded on the stud 50 and a screw 52, which is extended through the panel 20 and threaded into the sleeve 51. There are ordinarily five of these spacing sleeves in each windshield panel.

We have discovered that is it possible to secure a screen to the glass 13 at the lower edge of the latter and to extend this screen downwardly in substantially a vertical plane between the hood 21 and the cowl frame member 16, so that the screen will be concealed within the indirect ventilating air space when the windshield is closed. To this end, it is necessary to attach the screen to the glass at one end and to provide means for holding the other end of the screen taut and for moving the screen downwardly as the glass moves downwardly.

There are two methods of accomplishing the latter. In a vehicle in which the air space is unobstructed by spacing sleeves, the screen which is shown in Fig. 2 at 28 may be rolled at its lower extremity upon a spring roller 22, mounted upon a shaft 23, which may be secured in any convenient manner between the posts 10 or between the sides of the vehicle forwardly of the posts, as for instance by providing a depression in one post, as at 24, to receive one end of the shaft 23 and providing a bracket 25 on the other end of the shaft to receive a screw 26 to be fastened into the other end of the post.

It will be understood that any means for mounting the roller might be used, as for instance a pair of brackets separate from the shaft 23, one of the brackets being adapted to engage the shaft to prevent its turning.

A spring 27 is secured at one end to the shaft and at the other end to the roller 22.

The roller is allowed to roll freely upon the shaft, the spring being under tension at all times so as to exert tension against the screen at all times.

In securing the upper extremity of the screen to the glass, the problem of securing the screen in such a manner as not to interfere with the sealing of the glass against the cushion 18 is encountered. It is, of course, necessary that it be possible to lower the glass and to have it seat perfectly against the cushion so as to exclude moisture from the vehicle during rainstorms.

Another problem which has already been mentioned is that of securing the screen to the glass in such a manner that it will slide into the ventilating air space without interference.

In order to solve both of the problems just mentioned, we attach the screen to the glass through the medium of a member which will space the screen away from the glass on the inner side of the glass. The point of attachment to the glass must be above the lower edge thereof also, as will be more thoroughly explained a little later. For the purpose of attachment, we provide a channel 29, adapted to receive the lower edge of the glass 13, and to be secured thereto either by channeling the glass slightly, as at 30, and providing the channel 29 with lips to enter the channels 30, or by tapeing and cementing the channel to the glass, as in Fig. 8. The latter method is preferable since it involves no operation upon the glass and no necessity for removing the glass.

The channel 29 is provided on the inner side with a reversely channeled portion 31, which receives the upper extremity of the screen and spaces it inwardly from the glass 13 and upwardly from the lower edge of the glass.

It may now be noted that the cushion 18 has a lip 18ª on its inner corner, which extends above the general plane of the cushion. It is necessary to attach the screen in such a way that the glass may be lowered to rest against the cushion without this lip blocking the path of descent of the member 31 and the screen. For this reason, the member 31 is raised substantially above the lower edge of the glass. Another reason for attaching the screen substantially above the lower edge of the glass resides in the fact that there is a very limited space between the edge of the hood 21 and the inner face of the glass 13 and in order that the member 31 may clear the edge of the hood, it is necessary to space it closely enough to the glass so that there will be some friction between the screen and the corner of the cushion 18. By spacing the point of attachment of the screen above the lower edge of the glass, this friction will be reduced.

It may be noted that the use of the roller raises the problem of interference with the instruments, wires, tubes, etc., on and behind the instrument board 19. By spacing the roller a sufficient distance from the instrument board, the arrangement may be made to successfully operate, yet the problem of installation will remain. It is rather difficult to install the roller, to bring the screen up through the ventilating space and to attach it to the glass while the roller is exerting tension against it.

For this reason, we have conceived of the possibility of doing away with the roller and allowing its function to be replaced by some other means for keeping the screen taut, such as a rigid frame inclosing the screen on all sides. Before proceeding to specifically describe this form of our invention, reference may be had to Fig. 4, in which the roller type of construction is shown applied to a side window of the vehicle.

It is not our intention to claim as part of our invention the rolling screen attached to a side window of a vehicle and movable with the glass, such construction having been old for some time. However, the particular application of the means for securing the screen to the glass is thought to be novel in this connection. In this construction the upper side rail of the vehicle is indicated at 36 and is cut away to provide a cavity 35, in which the roller 22 may be installed. A slot 40 is provided in the frame member 36, through which the screen is passed. The member 29 is of the same construction as described for Fig. 2, with the exception that it is inverted and allows the window glass 34 to set against the window frame without interference.

The second method for maintaining the screen taut and for moving it downwardly with the glass is to provide a semi-rigid frame to which the screen is secured and which in turn is secured to the member 31. Such a frame eliminates the necessity of the roller and makes the screen easier to install.

This type of screen is shown in Figs. 5–8, inclusive, the frame comprising the upper rail 53, the side members 54 and the lower rail 55, all formed preferably of a single piece of material. The rail 53 is provided with openings 56 to receive screws of bolts 57, by means of which it is attached within the member 31.

In some vehicles, it will be found necessary to widen somewhat the space between the panel 20 and the member 16. This is done by inserting an auxiliary sleeve 70 and employing a slightly longer screw 52, in place of the screw already in use.

We have discovered that the space between the hood 21 and the shoulder 57, which defines the lower extremity of the panel 20, is sufficient to receive the frame shown in Figs. 5–8 when the glass is in its closed position. Furthermore, a screen of sufficient width may be used to be thus received between the hood 21 and the shoulder 57 and yet the lower extremity of which will conceal below the hood 21 when the glass is in its raised position. It is necessary that the lower extremity of the screen frame remain at all times below the hood 21, since the latter serves as a support for the screen when the windshield is open and a strong blast of air is impinging against the screen. Since a very fine mesh screen is used to exclude the larger dust particles, it will be seen that the problem of supporting the screen against pressure will be a substantial problem.

Thus, it will be seen that it is possible to employ a rigid frame, secured to the glass in such a manner as to slide vertically in a plane which clears both the member 16 and the hood 21, and which is entirely received in the space defined by the hood 21, the member 16, the shoulder 57 and the panel 20 when the windshield is closed.

A further advantage of the type of screen shown in Figs. 5–8 resides in the fact that the rigid frame may be provided with slots 58 to accommodate the sleeves 51, whereby this type of screen may be attached to the form of windshield employing the spacing washers without the necessity of removing the washers of the studs 50, the majority of the screen being at all times above the washers but a portion of the screen at its lower extremity being allowed to pass down through the spaces between the washers as the windshield approaches its closed position.

In order to strengthen the frame, it is provided with the vertical struts 59, positioned to receive the slots 58 and serving the double function of allowing for the slots and connecting the upper and lower rails of the frame to form a much more substantial structure.

In order that the screen may move up and down without interference, it is necessary to position it so that it will barely clear the edge of the hood 21, as shown in Fig. 8. However, inasmuch as the hood is curved from end to end in a horizontal plane at its upper edge, is is necessary to curve the screen also and in order to hold it in a curved position, the channel member 31 is curved from end to end, as shown in Fig. 7, which is a plan view of the channel. It may be noted at this point that the reason for spacing the screen so close to the edge of the hood 21 is that the frame member 16 is curved so that the glass is farther away from the inner extremity of the member 16 at its center than at its ends and the lip 18ª of the cushion is thicker at the center than at the ends in those types of vehicles wherein the panel is curved.

When the screen is completely raised, a small portion of the slots 58 will extend above the hood 21 but not enough to allow the entrance of any considerable amount of dust or foreign matter.

Summing up the principal features of our invention, the following will be noted:

First, that the indirect ventilating space of this type of vehicle can be adapted to serve as a receptacle to receive a screen attached to the windshield glass.

Second, that by attaching the screen to the glass above the lower edge thereof and spaced inwardly from the inner surface of the glass, that the screen may be positioned in a vertical plane, wherein it may freely slide into said indirect ventilating space.

Third, that by thus attaching the screen and allowing it to slide indirectly into the ventilating space, all necessity for alteration of the vehicle in order to accommodate the screen is eliminated.

Fourth, that by thus attaching the screen so that it shall be received in the indirect ventilating space in a plane closely adjacent the rear face of the cowl frame member, the screen will not only cover at all times the opening below the glass and above the hood 21, but will cover at all times the opening between the lower edge of the glass and the cushion 18, thereby screening the indirect ventilating opening also.

Fifth, that a screen may be provided with a rigid frame and by giving it the proper dimensions, it may be received within a space delimited by the upper and lower extremities of the panel and the panel and cowl frame member and yet may be made wide enough so that at all times its lower extremity will be positioned below the hood of the panel.

Sixth, that with such a rigid frame, the screen may be attached without removal of the spacing washers found in some windshields of this type.

Seventh, that with such an attachment, the setting of the windshield glass against its cushion so as to exclude moisture is not interfered with.

In some cases, it is found necessary to seat the panel 20 slightly away from the frame member 16 and for this purpose, we provide an auxiliary spacing sleeve 60 and the longer screw 52 to take the place of the screw already found in the vehicle. While this is an alteration of the vehicle it is such a slight alteration as to be inconsequential and to still render the installation of the device practical enough to be desirable.

The most important feature of our invention contributing to all of the results above mentioned is the use of a member which can be attached to the lower extremity of the glass in such a way as to form a seat to engage the cushion 18, and which is provided with an inwardly extending portion adapted to receive the screen frame.

The advantages of the rigid frame enumerated above can be preserved in the construction shown in Figs. 11 and 12.

The construction in this form of my invention is the same as the rigid frame construction with the exception that the side bars 54 and the intermediate bars 59 of the rigid frame are omitted, the upper and lower bars being referred to by the same characters 53 and 56, as in the rigid frame disclosure.

The bar 53 is secured to the same securing device 31, as in the previous forms of the invention.

The bar 56 is urged downwardly by a set of springs 80, which are secured to some fixed member below the cowl, as for instance the side posts 10.

The slots 58 found in the rigid frame construction are present also in this form of the invention and the outside dimensions of the screen are the same or substantially the same as those of the rigid frame type.

The installation of this type of the device is a simple matter, since it is only necessary to insert the screen from above to hook the springs into the bar 56 from below and then to stretch the springs and secure them to their permanent anchorage.

The same advantages of positioning the screen in a plane where it can slide down into the indirect ventilating air space of employing a screen which can be entirely received within the space delimited by the hood 21, the shoulder 57, the panel 20, and the member 16 and a further advantage which may be noted, namely, the use of a minimum width of screen, are present in this form as in the rigid type of construction.

An improved form of construction is shown in Fig. 9, utilizing all of the principles of the construction illustrated in Figs. 1–4 and adding the advantage of detachability of the screen from the glass.

All of the parts, with the exception of the means for securing the screen to the glass are identical with those shown in Fig. 2. (the roller being shown in a slightly different position relative to the frame member 16 by the same principle of engagement of the screen against the rear extremity of the cowl being involved). Consequently like reference characters are used to designate those parts which are the same.

The means for attaching the screen to the glass comprises a clip 90, attached to the glass in the same manner as the clip 29 of Fig. 2 but provided in place of the channel member 31 with an upwardly projecting flange 91, spaced inwardly from the glass 13. The screen 28 is secured to a separate member 92, which may be termed a binding strip and the binding strip is provided at its upper edge with a downwardly extending hook or channel 93, adapted to be received behind the flange 51 and to thereby secure the screen to the glass. It will be understood that the binding strip 92 is permanently attached to the screen by rivets 94 or the like or by soldering or brazing. The lower extremity of the strip 92 is provided with a flange 95, which is offset inwardly from the plane of the strip proper, being thereby spaced from the screen 28 so as to engage behind an upwardly turned lip 96 on the hood 21.

It may be now noted that the tension of the screen 28, when the binder strip is engaged with the flange 91 on the glass, will cause the flange 95 to travel in a path which will lead it to the position shown in full lines in Fig. 9 upon downward movement of the glass 13. Thus the binder strip will be hooked and retained by the flange 96 of the ventilating hood whenever the glass is lowered to closed position.

At the same time, the tension of the screen 28 will hold the hook 93 in engagement with the glass 13 so that as the glass moves upwardly, the flanges 91 will hook within the hook 93, carrying the screen upwardly as the glass moves on above the hood 21.

It will be understood that the transfer of the screen from the hood 21 to the glass will at all times be automatic and that the only action required by the operator is that of raising or lowering the glass. It will be noted further that the screen will close the ventilating opening between the hood and the cowl at all times.

When it is desired to disengage the screen from the glass the operator grasps with his fingers the upper extremity of the binder strip 94 and tilts the strip inwardly away from the glass. During this tilting movement, the binder strip will fulcrum upon its lower edge, remaining securely hooked behind the flange 96. Thus there will be no danger of the screen becoming disengaged from both the hood and the glass and rolling up upon the roller. While the binder strip is held away from the glass by the fingers of the operator, the glass may be rolled upwardly until the flange 91 has passed the hook 93. The glass will then be free of the screen. In order to return the glass to engagement with the screen, it is only necessary to roll it downwardly, the flange 91 forcing the hook 93 outwardly away from the glass as it passes the hook.

Our invention may be applied to the door of a vehicle as well as to the window, as shown in Fig. 10. Substantially the same device for engaging and disengaging the screen from the glass may be employed in such a construction, as well as in the type of construction shown in Fig. 4. In Fig. 10, we have used the reference character 60 to indicate generally a hollow, metallic door casing, in which is mounted the roller 22, carrying the screen 28 and the glass 61, to which is attached the clip 29. An opening 62 is cut in the casing 60 to allow passage of the screen and a binding strip 63, having the hook 64 engaging with the flange 29$^a$, is secured to the screen 28.

Instead of the flange 55, the binding strip 63 is provided with a flange 65, bent substantially at right angles to the binding strip and adapted to engage the intermolding strips 66 of the door casing. Operation of the detachable connecting device is the same as described for Fig. 9.

Some changes may be made in the construction and arrangement of the parts of our invention without departing from the real spirit of our invention, and it is our intention to cover by our claims any modified forms of structure or use of mechanical equivalents, which may be reasonably included within their scope.

We claim as our invention:

1. In a windshield screen for vehicles of the type employing a transverse cowl member, a windshield glass seating on the said cowl member from above, and movable in its own plane, a panel spaced inwardly from said cowl member to form a ventilating air space, and spacing elements connecting the panel and cowl member: a screen secured to the glass, inwardly of the inner surface thereof, in a vertical plane which clears the inner extremity of said cowl member, said screen including a frame having a lower horizontal frame bar provided with downwardly opening slots to receive said spacing elements.

2. In a windshield screen for a vehicle of the type employing a transverse cowl member, a windshield glass seating on said cowl member from above, and movable in its own plane, a panel spaced inwardly from said cowl member to form a ventilating air space, and spacing elements connecting the panel and cowl member: a screen secured to the glass, inwardly of the inner surface thereof, in a vertical plane that clears the inner extremity of said cowl member, said screen including a frame having upper and lower frame bars connected by struts, the lower frame bar being provided with downwardly opening slots to receive said spacing elements, said slots being aligned with the struts.

3. In a windshield screen for vehicles of the type employing a trasverse cowl frame member, a windshield glass seating on said frame member from above and movable in its own plane, a panel spaced inwardly from said frame member to form a ventilating air space, a screen bracket secured to the glass near its lower extremity and having a portion extending inwardly beyond the inner extremity of said frame member, and a screen removably secured to the said portion and received in said ventilating air space, whereby the screen is movable with the glass.

4. In a windshield screen for vehicles of the type having a transverse cowl frame member, a windshield glass seating on said frame member from above and movable in its own plane, and a panel spaced inwardly from the frame member to form a ventilating air space; a screen bracket secured to the glass near its lower edge and having a downwardly opening channel extending inwardly to a vertical plane which clears the inner extremity of said frame member, a screen removably secured to said downwardly opening channel and received in said ventilating space, the upper extremity of the screen being concealed within said channel.

5. In a windshield screen for vehicles of the type having a transverse cowl frame member, a windshield glass seating on said frame member from above and movable in its own plane, and a panel spaced inwardly from the frame member to form a ventilating air space; a screen bracket secured to the glass near its lower edge and having a portion extending inwardly beyond the inner extremity of the frame member, said bracket including an upwardly opening channel member pressed from sheet metal and adapted to grip the sides of the glass, extending under the lower edge thereof, and a screen secured to said inwardly extending portion and received in the ventilating space and slidable together with the glass.

6. In a windshield screen for vehicles of the type employing a transverse cowl member, a windshield glass seating on said frame member from above and slidable in its own plane, a panel spaced inwardly from said cowl member to form a ventilating air space; a screen bracket comprising an upwardly opening channel of sheet metal receiving the lower portion of the glass, a flange extending inwardly from the inner upper extremity of the channel, and means on the inner extremity of the flange for attachment to a screen; and a screen attached to said means, received in the ventilating space, and slidable vertically with the glass.

Signed this 15 day of May, 1928, in the county of Woodbury and State of Iowa.
DEL HUTSON.
ARTHUR LANGREN.

Signed this 15 day of May, 1928, in the county of Woodbury and State of Iowa.
LESTER E. IKE.
LYNN H. LATTA.